ROBERT E. FISCHELL
INVENTOR

BY Claude Funkhouser
ATTORNEY

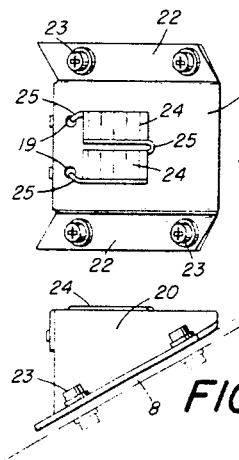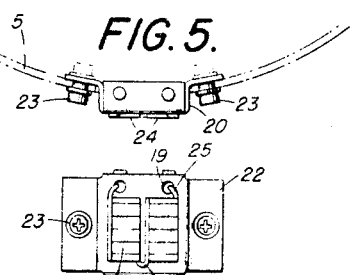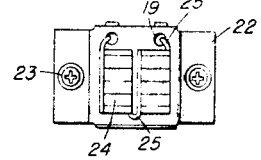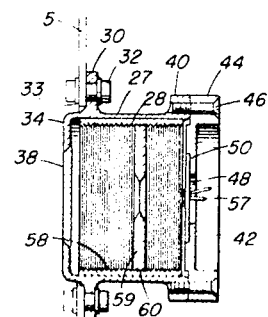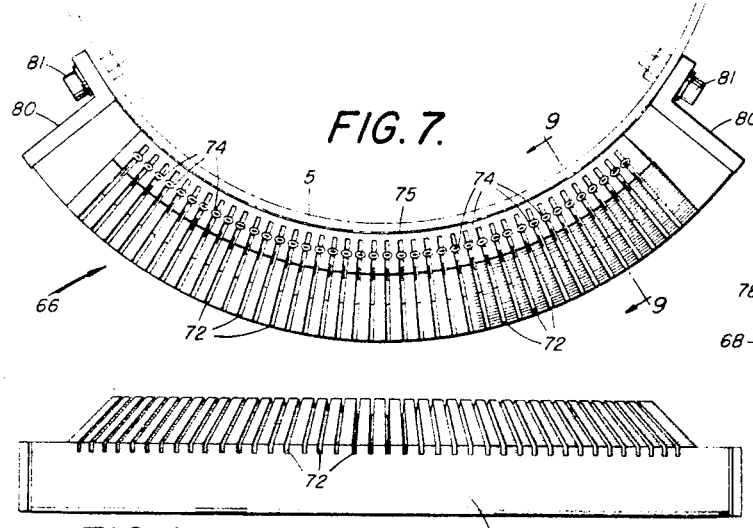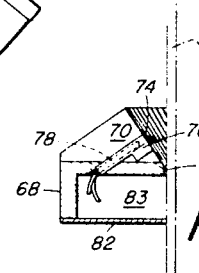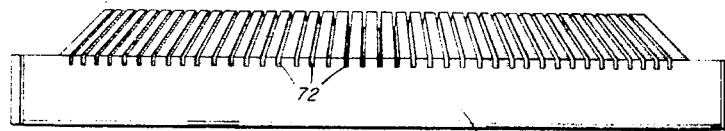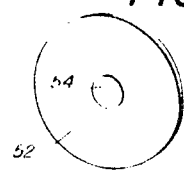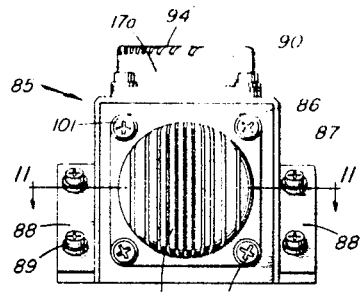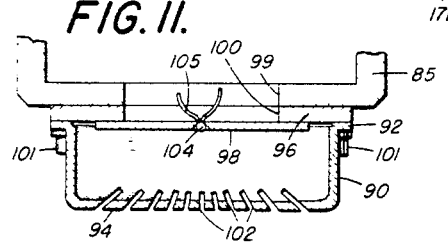
ROBERT E. FISCHELL
INVENTOR
BY Claude Funkhouser
ATTORNEY

ROBERT E. FISCHELL
INVENTOR

BY Claude Funkhouser
ATTORNEY

United States Patent Office 3,424,907
Patented Jan. 28, 1969

3,424,907
SATELLITE ATTITUDE DETECTION SYSTEM INCLUDING COSINE AND SPINSATE DETECTORS
Robert E. Fischell, Silver Spring, Md., assignor to the United States of America as represented by the Secretary of the Navy
Filed Mar. 4, 1963, Ser. No. 262,811
U.S. Cl. 250—203     8 Claims
Int. Cl. G01j 1/20

This invention relates in general to attitude detection systems and, more particularly, to an attitude detection system suitable for use in a space environment for determining the position of a satellite with respect to the sun.

Frequently, a satellite that is placed in orbit requires considerable time to properly align itself with the earth and cease its random tumbling and rotating through space. An example of such a stabilization process is fully described by Robert E. Fischell et al. in their U.S. patent application "Magnetic Attitude Control," Ser. No. 99,644, filed Mar. 30, 1961, now Patent No. 3,118,637. This stabilization process takes days to complete, but it is only then that the satellite begins its active functions. Obviously, it is impossible to calculate when the satellite is sufficiently stabilized to begin its active functions. Therefore attitude detection instruments are placed aboard the orbiting satellite, which instruments transmit information from which it is possible to compute the attitude of the satellite. These instruments are compatible with the electronic circuitry in the satellite, so the information from the instruments can share the existing communications link between the satellite and the ground. Additionally, the instruments are situated aboard the satellite so as to describe the position of the satellite in its three possible planes of movement, thereby defining completely the satellite's position in inertial space.

The instant invention is designed to determine a satellite's position by sensing the angular relationship between the sun and the satellite. This information locates the satellite with respect to the sun, and whenever it is desirable that the satellite have a particular attitude with respect to the earth, the desired attitude is calculated from the information locating the satellite with respect to the sun, since the earth-sun relationship is well-known.

One object of the present invention, therefore resides in providing an attitude detection system for describing the attitude of a satellite with respect to the sun.

Another object of the invention is to provide an attitude detection system which describes the rate of spin of a satellite.

A further object of the invention is to provide an accurate satellite attitude detection system which is passive in nature.

Other objects and many of the attendant advantages of this invention will be readily appreciated as the same becomes better understood by reference to the following detailed description when considered in connection with the accompanying drawings, wherein:

FIG. 2 is a front elevation of a cosine attitude detector employed in the instant invention;

FIG. 3 is a side elevation of the cosine attitude detector shown in FIG. 2;

FIG. 4 is a front elevation of a second embodiment of a cosine attitude detector;

FIG. 5 is a top view of the cosine attitude detector shown in FIG. 4;

FIG. 6a is a longitudinal section of a linear attitude detector which is utilized in the present invention;

FIG. 6b is a front elevation of a terminal board employed in the linear attitude detector shown in FIG. 6a;

FIG. 7 is a top view of a binary attitude detector;

FIG. 8 is a side elevation of the binary attitude detector shown in FIG. 7;

FIG. 9 is a sectional view of the binary attitude detector taken on line 9—9 in FIG. 7;

FIG. 10 is a front elevation of a spin rate detector utilized in the instant invention;

FIG. 11 is a sectional view of the spin rate detector taken on line 11—11 in FIG. 10;

Briefly, the invention comprises a number of different solar detectors arranged about the surface of a satellite. These detectors are specifically arranged on the main axes of the satellite and at other positions, so that their combined output information, when transmitted to earth, is sufficient to fix the attitude of the satellite with respect to the sun and the spinning rate of the satellite. Obviously, the angular relationship between the sun and the earth is well-known. Therefore, when the attitude of the satellite with respect to the sun is known, its attitude toward the earth is also known.

The "System for Gravity Orienting a Satellite" of Robert R. Newton, as described in his U.S. patent application, Ser. No. 249,961, filed Jan. 7, 1963, now Patent No. 3,148,846 can only be activated when the vertical axis of the satellite is properly oriented with respect to the earth. Therefore, the following system has been designed as an aid in determining when the satellite is properly oriented to begin the gravity stabilization process.

Figure 1:
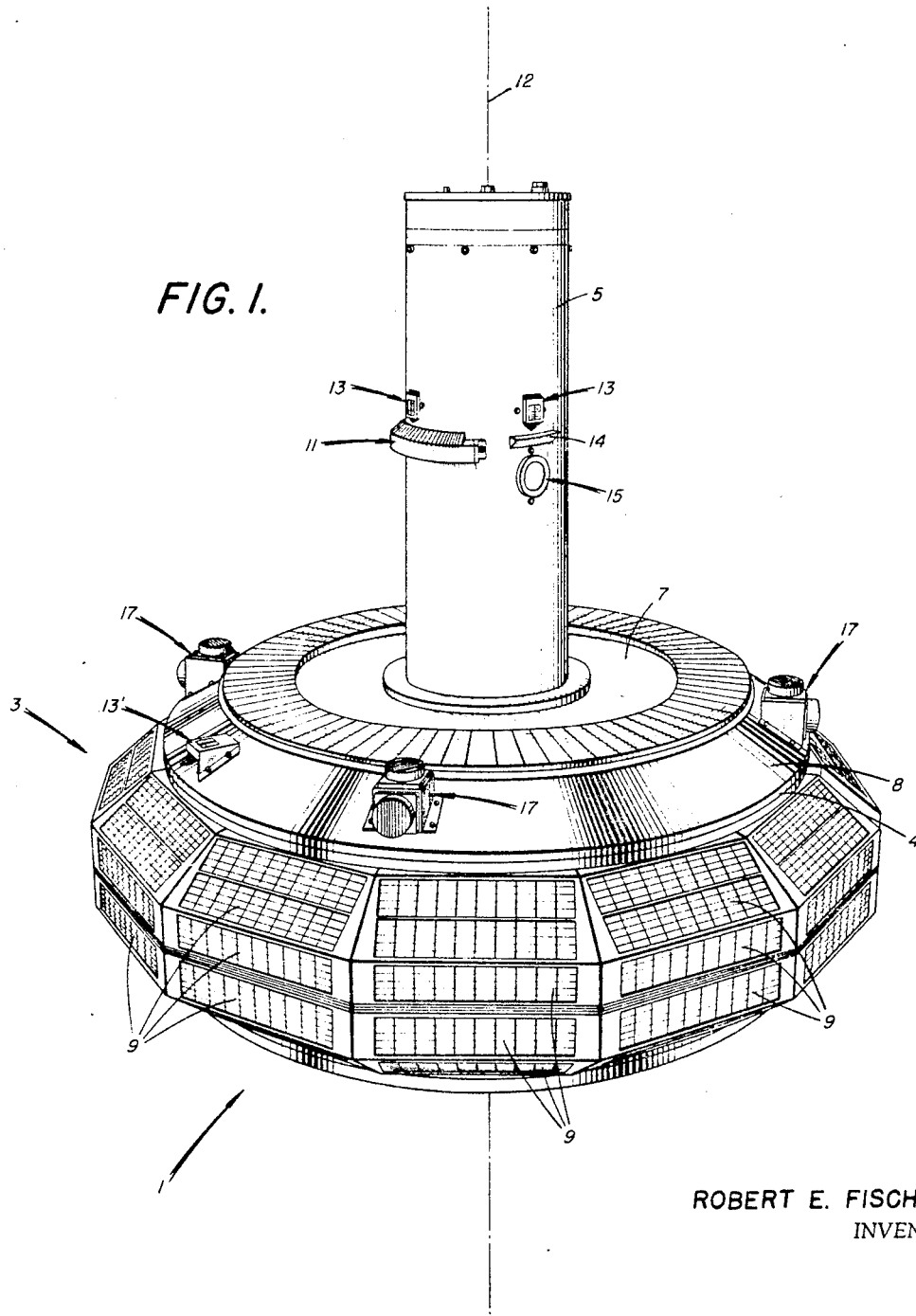
FIG. 1 is a perspective view of a satellite employing the instant invention.

Referring to FIG. 1, there can be seen a satellite 1 having an annular main body 3, an annular side wall 4 and a cylindrical mast 5 protruding from a top wall 7 of the body 3. A frusto-conically shaped collar 8 joins the top wall 7 with the side wall 4, as the top wall 7 is of lesser diameter than the side wall 4. A plurality of solar cell panels 9 are attached about the side wall 4 of the satellite. The solar cells mounted on each of said panels 9 generate the electrical energy required to energize the electronic circuits carried within the satellite body 3. A binary attitude detector 11 is mounted on the mast 5 and is located about a 90° segment of a circle which is perpendicular to a centerline 12 of the satellite, which line additionally passes through the center of the mast 5. Four cosine attitude detectors 13 are spaced 90° apart and in the same horizontal plane on the surface of the mast 5 for detecting solar rays in the horizontal direction. An additional cosine detector 13' is mounted on the collar 8 and is oriented to detect solar rays from the vertical direction. Only two of the cosine attitude detectors 13 which are mounted on the mast 5 are shown, and one of them is centrally placed above the detector 11. These five cosine detectors 13 and 13' define the three main rectangular axes of the satellite, which axes originate from the centerline 12.

A linear solar attitude detector 15 is positioned beneath one of said cosine attitude detectors 13. Interposed between the linear detector 15 and the cosine detector 13 is a sun shade 14, which shade prevents the sun from shining upon the detectors 13 and 15 at undesirable angles. A plurality of spin rate detector assemblies 17 are mounted on the collar 8, only three of which are shown.

Figure 13:
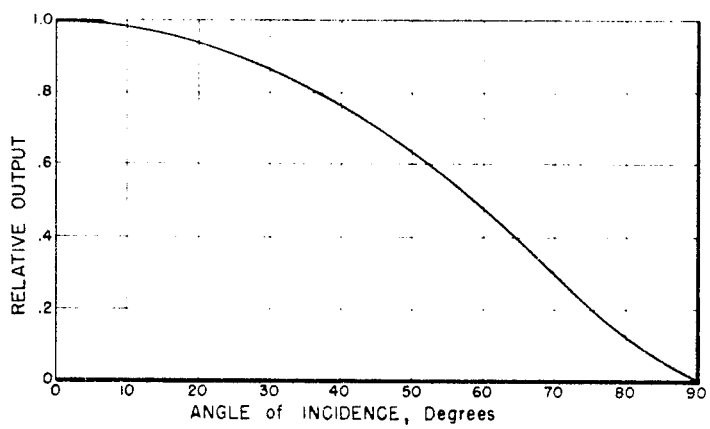
FIG. 13 is a graph showing the relative output of the cosine solar attitude detector as a function of the angle with respect to the sun.

Referring to FIGS. 2 through 5, various views of a cosine attitude detector employed in this invention are shown. Said detector includes a front mounting plate 18 formed with a pair of ports 19, a pair of side wings 20, and a pair of flanges 22 by which the detector is attached, by suitable attaching screws 23, to the satellite 1. A pair of solar cells 24 are attached to the mounting plate 18, and provide an output which is proportional to the cosine of the angle of incidence of the sun. However, this detector provides a useful output signal for only an arc of 60°, as shown in FIG. 13, which arc begins at 30° off normal incidence and extends to 90° off normal incidence. Electrical connections are made by ports of a plurality of wires 25 passing through said ports 19.

FIG. 6a shows the linear detector 15 employed in the instant invention. The linear detector comprises an annular housing 27 having a central bore 28, a pair of attaching lugs 30 being provided on the forward end of the housing to receive screws 32 for mounting the detector within an opening 33 in the mast 5. The lugs are set back from the forward end of the housing a distance sufficient to permit a portion of the housing 27 and an integral annular end plate 34 to be received through the opening 33 in the mast. The end plate 34 additionally has a circular portion cut therefrom into which a lens 38 is placed. An additional pair of lugs 40 is positioned upon the aft end of the housing 27, and a back plate 42, having an integral pair of lugs 44, is attached to said housing 27 by a pair of screws 46 that extend through the lugs 44 into the lugs 40. Said back plate 42 is formed with a central hole 48 and a forward annular recess 50, of greater diameter than said hole and approximately ½ the diameter of the plate 42. A terminal board 52, shown in FIG. 6b is mounted in said recess and has a solar cell 54 mounted thereon. Electrical connections are made to the solar cell by a pair of wires 57.

Figure 12:
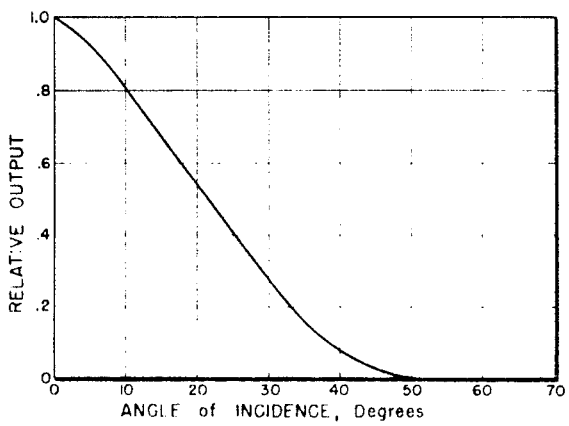
FIG. 12 is a graph showing the relative output of the linear attitude detector as a function of the angle with respect to the sun.

The solar cell 54 mounted on the board 52 has an output which is linearly proportional to the angle of incidence of the sun for 0° through 30°, angle of incidence, as seen in FIG. 12. Therefore, using the linear detector 15 in combination with the cosine detector 13 provides a full 90° coverage.

The bore 28 of the housing 27 is formed with a plurality of threads 58, and is coated with a light absorbent black material. Parson's optical black lacquer is a suitable covering for the bore 28. An annular baffle 59 having a threaded rim 60 is screwed into the bore to prevent any reflected light from reaching the solar cell 54.

The binary attitude detector employed in this invention is shown in FIGS. 7 through 9. This detector consists of an arcuate mounting assembly 66 having a substantially triangular cross-section 70 and a depending integral forward wall 68. Additionally, the assembly 66 is formed with a plurality of spaced parallel slots 72, which slots extend from the top of the wall 68 and through substantially all of triangular section 70 and a plurality of holes 74 which are slightly spaced from but are located along the inner periphery 75 of said assembly 66. Said slots are spaced 2.25° apart, and said holes 74 are each of sufficient diameter to receive a diode holder 76 and a photodiode 78, number 1N2175, contained therein. A mounting bracket 80 is preferably welded to each extremity of the assembly 66. The brackets and bolts 81 attach the detector to the mast 5 of the satellite 1. A bottom wall 82 cooperates with the assembly 66 for defining a cavity 83 which cavity is suitable for receiving the electronic apparatus associated with the detector 11.

The detector 11 operates upon the principle that a photodiode, when illuminated by sunlight, will have a marked change in resistance as compared to its non-illuminated condition. If the illumination of the photodiode is restricted by an appropriate aperture, it is possible to determine the detector angle or attitude relative to the sun, or relative to any other collimated source of light.

FIGS. 10 and 11 show one of the spin rate detector assemblies 17 employed in the instant invention, mounted on a bracket 85, which bracket comprises a front wall 86, a side wall 87 and a pair of integral flanges 88 for attaching said bracket to the collar 8 of said satellite 1, a plurality of suitable attaching means 89 being provided for the purpose. A pair of the spin rate detectors 17a and 17b are shown mounted on the bracket 85 perpendicular to each other, and each comprises an annular side wall 90 having an integral flange 92 and an integral cover 94, a base plate 96 positioned between said bracket 85 and said flange 92, and a mounting plate 98 attached to said plate 96 as by cementing. Said bracket 85 is formed with a hole 99 which is aligned with a hole 100 in said plate 98. Said flange 92 and said plate 96 are held to said bracket 85 by suitable attaching means 101. Said cover 94 is formed with a plurality of parallel slots 102 cut therein and extending partially into said side wall 90. The slots may be displaced 10° apart from each other, as measured from their focusing point on a photodiode 104 carried by the mounting plate 98. Electrical connections are made to said photodiode 104 by a pair of wires 105 which extend into the interior of the satellite 1 through said holes 99 and 100.

The detectors 17a and 17b operate on the principle that the photodiode 104 provides an output pulse every time it is exposed to the rays of the sun. Therefore, as the satellite spins and the rays of the sun alternately pass through the slots 102 and fall on the photodiode 104, a series of output pulses is generated, from which series of pulses it is possible to compute the rate of spin of the satellite 1.

As can be clearly seen in FIG. 10, the slots in the detector 17a are situated at a 45° angle with respect to the slots in the detector 17b. In this manner, the slots in the detector 17a are made parallel to planes passing through the two vertical axes of the satellite, which planes have been defined as passing through said cosine detectors 13. Therefore, the information generated by the detectors is relative to a main satellite axis.

In functioning as a unitary system, the individual detectors generate signals in response to the solar rays they intercept. The combined outputs from the linear and cosine detectors 15 and 13 show the attitude of the satellite with respect to the sun. The spin rate detectors 17a and 17b operate most effectively at higher rates of spin in determining the rate of spinning of the satellite about its magnetically stabilized axis. The binary detector 11 is used at slow spin rates as its design allows interpolating the attitude of the satellite with a resolution considerably better than 1°.

Figure 14:
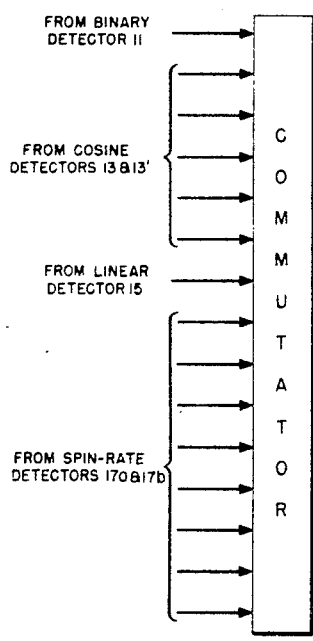
FIG. 14 is a schematic of the attitude detection system as an integrated part of the electronic system carried by the satellite.

All of the detectors are individually connected to a satellite commutator 108, as seen in FIG. 14, which commutator time selects the output of each detector for transmission by a telemetry transmitter 110 carried by the satellite and then by the remaining satellite circuitry located at ground installations where it is interpreted.

Obviously, many modifications and variations of the present invention are possible in the light of the above teachings. It is therefore to be understood that within the scope of the appended claims the invention may be practiced otherwise than as specifically described.

What is claimed is:

1. In combination with an orbiting satellite having an integral collar portion and a telemetry transmitter thereaboard, an attitude detection system responsive to solar radiation, comprising, a mast protruding from said satellite and attached thereto, a plurality of solar cells disposed about said mast for measuring direct solar radiation, an assembly mounted on said mast and formed with a plurality of slots, a photodiode positioned in each of said slots for sensing said radiation, a plurality of photodiodes positioned upon said collar for sensing said radiation, cover means for interrupting the steady impingement of incident solar radiation upon said plurality of photodiodes, each of said solar cells and said photodiodes being connected to said transmitter, and a commutator mounted within said satellite and connected to each of said photodiodes and said solar cells for individually time selecting their outputs whereby they may be transmitted to earth via said telemetry transmitter.

2. In combination with an orbiting satellite having an integral collar portion, and a telemetry transmitter thereaboard, an attitude detection system responsive to incident solar radiation, comprising, a mast extending from said satellite and attached thereto and formed with an opening, a plurality of solar cells uniformly disposed in a horizontal plane upon said mast, a housing mounted in said opening, a solar cell positioned in said housing for measuring said incident solar radiation, an assembly mounted on said mast and formed with a plurality of radial slots, a photodiode positioned at the inward terminus of each of said slots, a plurality of photodiodes positioned upon said collar for sensing said radiation, cover means for interrupting the steady impingement of incident solar radiation upon said plurality of photodiodes, and a commutator mounted within said satellite and connected to each of said photodiodes and said solar cells for individually time selecting their outputs whereby they may be transmitted to earth via said telemetry transmitter.

3. In combination with an orbiting satellite having an integral collar portion, and a telemetry transmitter thereaboard, an attitude detection system responsive to incident solar radiation, comprising, a circular mast protruding from said satellite and attached thereto and formed with an opening, a plurality of solar cells uniformly disposed about a circle on a horizontal plane about said mast for generating a signal proportional to the angular inclination of said cells with the sun for a portion of a vertical quadrant, a housing mounted in said opening, a solar cell carried by said housing and generating a signal proportional to the angular inclination of said cell with the sun for the complement of said quadrant, an assembly mounted on said mast and formed with a plurality of radial slots, a photodiode positioned at the inward terminus of each of said slots for sensing the presence of incident solar radiation, a plurality of photodiodes positioned upon said collar for sensing said radiation, cover means for interrupting the steady impingement of incident solar radiation upon said plurality of photodiodes, and a commutator mounted within said satellite and connected to each of said photodiodes and said solar cells for individually time selecting their outputs whereby they may be transmitted to earth via said telemetry transmitter.

4. An attitude detection system as recited in claim 3, wherein said housing is formed with a central bore and further comprises, an end plate received within said opening of said mast and formed with a cut-out portion, a lens mounted in said portion for filtering incident sunlight, a back plate for carrying said solar cell, a plurality of threads covered with light absorbent material and formed in said bore for preventing the reflection of reflected rays of incident light, and a baffle positioned within said bore, and formed with a plurailty of threads engaging the first-mentioned threads, whereby the position of said baffle may be adjusted within said bore by movement of the baffle along said threads.

5. An attitude detection system as recited in claim 3, wherein said cover means comprises, an annular side wall, and an integral cover formed with a plurality of parallel slots extending partially into said side wall, said slots being spaced at 10° intervals as measured from each of said photodiodes mounted on said collar.

6. In combination with an orbiting satellite having an integral collar portion, and a telemetry transmitter thereaboard, an attitude detection system responsive to incident solar radiation, comprising, a circular mast protruding from said satellite and attached thereto and formed with an opening, a plurality of solar cells uniformly disposed about a circle on a horizontal plane about said mast, each of said cells generating a signal proportional to the angular inclination of said cell with respect to the sun for a portion of a vertical quadrant, a housing mounted in said opening and positioned below one of said cells, a solar cell carried by said housing for generating a signal proportional to the angular inclination of said last-mentioned cell with respect to the sun for the complement of said quadrant, an assembly mounted to extend about a 90° arc of said mast and formed with a plurality of uniformly spaced radial slots, a photodiode positioned at the inward terminus of each of said slots for sensing the presence of incident solar radiation, a plurality of photodiodes positioned upon said collar for sensing said radiation, cover means for periodically interrupting at 10° intervals the steady descent of incident solar radiation upon said plurality of photodiodes, and a commutator mounted within said satellite and connected to each of said photodiodes and said solar cells for individually time selecting their outputs whereby they may be transmitted to earth via said telemetry transmitter.

7. An attitude detection system as recited in claim 6, wherein said housing is formed with a central bore and further comprises, an end plate received within said opening of said mast and formed with a cut-out portion, a lens mounted in said portion for filtering incident sunlight, a back plate for holding said solar cell carried by said housing, a plurality of threads covered with light absorbent material and formed in said bore for preventing the reflection of reflected rays of incident light, and a baffle positioned within said bore and formed with a plurality of threads mating with said first-mentioned threads, whereby the position of said baffle may be adjusted within said bore by movement of the baffle along said threads.

8. In combination with an orbiting satellite, an attitude detection system responsive to solar radiation, including a plurality of first cosine attitude detectors mounted on said satellite such that their centers lie equidistantly spaced about the periphery of a circular horizontal plane for receiving horizontal solar radiation, second cosine attitude detector means mounted on said satellite for receiving vertical solar radiation,
a linear solar attitude detector mounted on said satellite beneath one of said first cosine attitude detectors and being linearly responsive to incident solar radiation, whereby said linear solar attitude detector will combine with its corresponding first cosine attitude detector to provide a full ninety degrees of coverage of incident solar radiation,
a sun shade mounted on said satellite between said linear solar attitude detector and its corresponding first cosine attitude detector for preventing solar radiation from impinging on said linear and said corresponding first cosine attitude detector at undesirable angles,
a binary attitude detector mounted on said satellite beneath one of said first cosine attitude detectors and having a plurality of spaced parallel slots therein,
a plurality of photodiodes, each mounted within one of said spaced parallel slots, whereby said slots will act as apertures for their respective diodes so as to enable them to issue signals, responsive to solar radiation, indicative of the attitude of said satellite with respect to the sun,
a plurality of spin rate detectors mounted on said satellite for determining the rotational velocity thereof, and
a commutator connected to each of said plurality of first cosine attitude detectors, said second cosine attitude detector means, said linear attitude detector, each of the photodiodes in said binary attitude detector, and each of said plurality of spin rate detectors, whereby their outputs may be individually time selected for providing signals indicative of the attitude and rotational velocity of said satellite.

References Cited
UNITED STATES PATENTS

| | | |
|---|---|---|
| 3,037,121 | 5/1962 | Collision _____ 250—203 |
| 3,059,120 | 10/1962 | Anthony _____ 250—203 X |
| 3,090,583 | 5/1963 | Behun et al. _____ 250—203 X |
| 3,110,812 | 11/1963 | Hulett et al. _____ 250—203 |

RALPH G. NILSON, *Primary Examiner.*

M. ABRAMSON, *Assistant Examiner.*

U.S. Cl. X.R.

250—239